May 9, 1939.　　　　R. ATTI　　　　2,157,317
AUTOMOBILE DIRECTION INDICATOR
Filed April 27, 1935
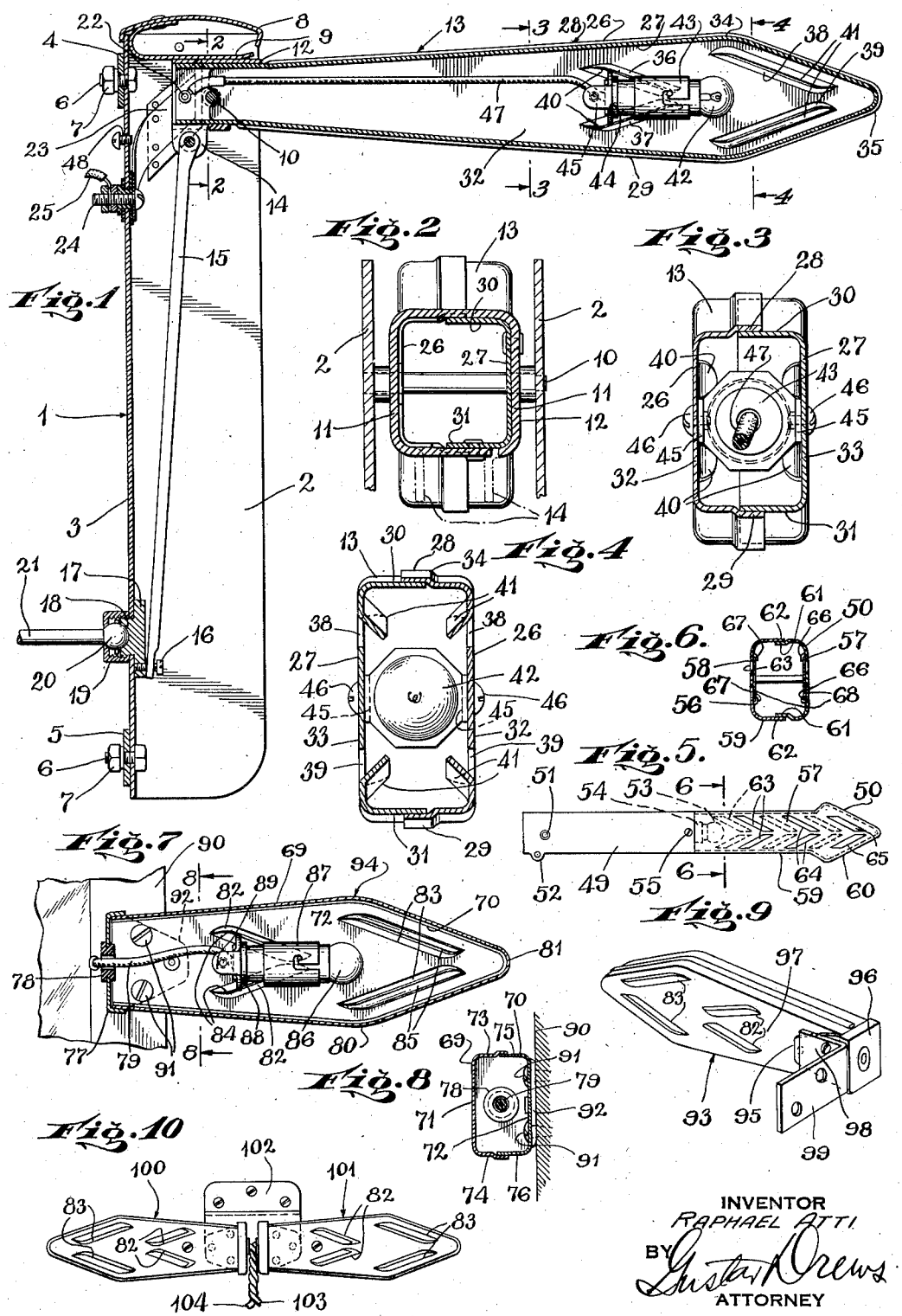
INVENTOR
RAPHAEL ATTI
BY Gustav Drews
ATTORNEY Patented May 9, 1939

2,157,317

UNITED STATES PATENT OFFICE 2,157,317

AUTOMOBILE DIRECTION INDICATOR

Raphael Atti, Union City, N. J.

Application April 27, 1935, Serial No. 18,503

2 Claims. (Cl. 116—54)

This invention relates to automobile direction indicators in general and more especially to manually operated automobile direction indicators such as disclosed in the application for patent, Serial No. 645,404 filed December 2, 1932, now Patent No. 2,047,541.

Among the objects of the present invention, it is aimed to provide an automobile direction indicator or signal which can be manufactured at low cost and be sold at a price within the reach of all operators of automobiles, the operation and cost of which is insignificant, and the operation of which can be effected by the most unskilled and weak requiring neither the exercise of any appreciable mental or physical effort.

Among the objects of the present invention, it is also aimed to provide an improved construction of manually operated automobile direction indicator which can be produced by the average machine shop without any special equipment and which consists essentially of standard parts now readily obtainable in the open market.

It is still further an object of the present invention to provide an improved arm for an automobile direction indicator including a hollow metal casing for a source of illumination such as an electric lamp, which casing has a plurality of light emitting openings, slots or the like through which the light rays from the source of illumination may pass.

It is still another object of the present invention to provide an improved arm for an automobile direction indicator including a hollow casing for a source of illumination, such as an electric lamp, which casing has a plurality of light reflecting faces, and openings, slots or the like through which light rays from the source of illumination and reflecting faces may pass.

These and other features, capabilities and advantages of the invention will appear from the subjoined detail description of specific embodiments thereof illustrated in the accompanying drawing in which Figure 1 is a transverse section of an automobile indicator made according to one embodiment of the present invention shown in direction indicating position;

Fig. 2 is an enlarged section on the line 2—2 of Fig. 1;

Fig. 3 is an enlarged section on the line 3—3 of Fig. 1;

Fig. 4 is an enlarged section on the line 4—4 of Fig. 1;

Fig. 5 is a side elevation of an arm of an automobile direction indicator of a second embodiment;

Fig. 6 is an enlarged transverse section on the line 6—6 of Fig. 5;

Fig. 7 is a transverse section of an automobile direction indicator of a third embodiment;

Fig. 8 is a section on the line 8—8 of Fig. 7;

Fig. 9 is a perspective of a fourth embodiment of the present invention; and

Fig. 10 is a front elevation of a fifth embodiment of the present invention.

In the embodiment shown in Figs. 1 to 4 inclusive, there is provided a vertically extending frame 1 which is substantially U-shaped in cross-section having two lateral wall members 2 and an intermediate connecting wall member 3. The intermediate wall member 3 in the present instance is adapted to be connected to the side of an automobile by the brackets 4 and 5 to which the intermediate wall member 3 is connected by suitable means, such as the bolts 6 and nuts 7.

To the upper end of the frame 1, there is preferably connected a cap 8 having a yieldable tongue 9 connected thereto and extending below the cap 8.

Adjacent the tongue 9, there is provided a pivot pin 10 extending through the wall members 2 and extending through the opposing cheeks 11 of the sleeve 12 of the arm 13. The arm 13 has adjacent to the pivot pin 10 an ear 14 to which is pivotally connected the link 15 pivotally connected at its lower end to the pin 16 mounted on the disc 17 having a hub 18 rotatably mounted in an opening formed through the intermediate wall member 3. The hub 18 has in the present instance connected thereto the cap 19 which anchors the ball 20 of the control arm 21.

Adjacent to the contact pin 22 and to engage the same when the arm 13 is in direction indicating position, there is provided the contact plate 23 which is preferably composed of yieldable metal extending along one wall member 2 and connected at its lower end to the intermediate wall member 3 by the binding post 24 which in turn is connected to the electrical conductor 25 in the usual way.

The arm 13, see particularly Figs. 3 and 4, is composed of two complemental casing members 26 and 27 which are connected to extend into the sleeve 12. The casing member 26 has flange portions 28 and 29 to overlap the inwardly extending wall members 30 and 31 of the casing member 27. The casing members 26 and 27 are substantially U-shaped in cross-section throughout, see the sections taken on the line 3—3 and 4—4 respectively.

In side elevation, however, the main intermediate wall members 32 and 33 of the housing members 26 and 27 become wider as they approach the point 34, see Fig. 1 and then taper off into the nose or closed extremity 35.

The casing members 26 and 27 in the present embodiment are each provided with two sets of slots, see Fig. 1, which shows the inner face of the casing member 27 provided with an inner pair of short slots 36 and 37 which converge in the direction of the extremity 35 and a pair of longer slots, to wit the slots 38 and 39 extending from the bend 34 toward the extremity 35 and similarly converging in the direction of the extremity 35.

In this embodiment, the slots 36 to 39 inclusive are provided with louvers consisting of the flanges 40 bent inwardly from the inner edges of the openings 36 and 37 and the flanges 41 bent inwardly from the outer edges of the openings 38 and 39. These flanges are so disposed relative to the source of light, to wit the lamp 42, that the light rays will strike the outer faces of the louvers 40 and 41 and deflect them outwardly. In order to facilitate directing the light rays from the lamp 42 onto the outer faces of the louvers 40 and 41, the lamp 42 is disposed beyond the outer ends of the louvers 40 in the direction of the extremity 34 and adjacent the inner ends of the louvers 41 remote from the extremity 35.

The lamp 42 is preferably mounted in a socket 43 secured to the bracket 44 having the ears 45 screw-threadedly to receive the inner ends of the screws 46 extending through the opposing cheeks 32 and 33 of the housing members 26 and 27. The socket 43 is connected at its inner end to the conductor 47 which extends back and is connected to the contact pin 22.

Preferably to increase the light efficiency, the inner faces of the casing members 26 and 27 are covered with a light reflecting coating, such as yellow paint, a luminous paint or the like. Preferably the outer faces of the louvers 40 and 41 are covered with a light reflecting coating, such for instance as a luminous paint or paint of a light color, such as yellow or the like.

With the embodiment illustrated in Figs. 1 to 4 inclusive, the current for the lamp 42 may emanate from a battery or the like mounted in the automobile, one terminal of which is connected for instance by the conductor 25 to the binding post 24 and when the automobile is composed of conducting metal then the other terminal of the battery is grounded and the socket 43 grounded through the arm 13 in engagement with which the metal bracket 44 is disposed, and which arm 13 is in turn electrically connected through the frame 1 to the metal body of the automobile.

On the other hand, if the automobile should not be entirely composed of metal then the frame 1 is grounded to the metal portion of the automobile by a conductor connected to the binding post 48.

In the embodiment shown in Figs. 5 and 6, another type of arm is illustrated to be used in place of the arm 13. This arm consists essentially of a chambered metal portion 49 and a second member 50. The chambered portion 49 is preferably provided with an opening 51 to accommodate a pivot pin, such as the pivot pin 10 of the embodiment illustrated in Fig. 1 and also provided with an orificed ear 52 to be pivotally connected to a link, such as the link 15 of Fig. 1.

The lamp 53 in the present instance is connected to a socket mounted in a bracket 54 secured by suitable fastening means, such as the screw 55 to the chambered portion 49 and is in turn connected to a binding post, such as the binding post 22 of the embodiment illustrated in Fig. 1 by a conductor, such as the conductor 47 of Fig. 1.

The member 50 in this embodiment is a complement of the member 56 having opposing cheeks 57 and 58 respectively formed into a chambered shaft 59 and an arrow head formation 60. The member 50 has inwardly extending flanges 61 which snugly engage the inner faces of the inwardly extending flanges 62 of the member 56. Each of the members 50 and 56 are provided in the present instance with three sets of inclined slots, to wit the sets 63, 64 and 65 which are staggered relative to one another, the slots of each set converging toward one another in the direction of the arrow head formation 60.

Here too, the inner faces of the members 50 and 56 are preferably covered with a suitable light reflecting coating such as a luminous paint or the like and the light rays from the lamp 53 both direct and reflected will pass outwardly through the openings 63, 64 and 65. In some cases, it may be desired to cover the openings 63, 64 and 65 to prevent the admission of dirt or rain into the chamber formed between the members 50 and 56 in which cases there are provided the sets of fingers 66 and 67 disposed adjacent to the outer ends of the slots 63, 64 and 65. The fingers of each set 66 and 67 extend toward one another and form a space adjacent to the inner faces of the members 50 and 56, to accommodate a sheet of translucent material, such for instance as the sheets of celluloid 68.

In the embodiment shown in Figs. 7 to 10 inclusive, there are illustrated arms that are intended to be fixed in an outwardly extending direction and the traffic signal produced by lighting the lamp within the arm. Each of the arms consists essentially of two complemental shells 69 and 70 having opposing cheeks 71 and 72 respectively and inwardly extending flanges which overlap one another. In the present instance, the flanges 73 and 74 of the shell 69 are bent outwardly at their ends to overlap the flanges 75 and 76 of the shell 70.

The shells 69 and 70 have their inner ends enclosed by a cap 77 through which an insulated bushing 78 extends provided with an opening for the electric conductor 79. The shells 69 and 70 together form a finger having a chambered portion diverging from the cap 77 to the curved portion 80 and a second chambered portion between the curved portion 80 and the closed nose or extremity 81 which converges from the point 80 to the point 81.

The cheeks 71 and 72 each preferably have two pairs of openings, to wit the openings 82 constituting one pair and the openings 83 constituting the other pair. Each pair of openings 82 and 83 converge in the direction of the extremity 81 as shown in Fig. 7.

Furthermore, the openings 82 are provided with louvers 84 bent inwardly from the adjacent inner edges of the openings 82, and the openings 83 are provided with louvers 85 bent inwardly from the outer edges of the openings 83. These louvers cooperate with the source of light, such as the lamp 86 so that the light rays from the lamp 86 may be received by the outer faces of the louvers 84 and 85, similar to the cooperation of the louvers 40 and 41 with the lamp 42 of the embodiment illustrated in Fig. 1. So that the lamp 86 may so cooperate with these louvers 84 and 85, it is positioned adjacent the inner ends of the louvers 85 and the outer ends of the louvers 84, being mounted in the socket 87 secured to the bracket 88 which is provided with ears 89 secured to the cheeks 71 and 72 of the shells 69 and 70. The bracket 88 preferably is provided with a central opening to receive the electric conductor 79.

In the embodiment illustrated in Figs. 7 and 8, a single arm is shown connected to the frame 90 of the automobile as an instance, this connection being made as shown by screws 91 extending through the cheek 72 and then through the lip portion 92 of the cap 77 into the frame 90.

In the embodiment illustrated in Figs. 7 and 8 obviously the arm extends transversely of the vehicle to which it is connected, in which case the face of the frame 90 to which the cheek is parallel extends in a plane that is transverse to the vehicle.

In the embodiment illustrated in Fig. 9, the arm 93 there shown is similar to the arm 94 shown in Fig. 7 except that the lip 95 of the cap 96 and the cheek 97 are connected to the flange 98 of an angle iron having a flange 99 that extends longitudinally of the vehicle and is connected to a longitudinally extending face of the vehicle with the arm 93 and flange 98 extending transverse to the vehicle.

In Fig. 10, two arms 100 and 101 are shown similar to the arm 94 and similarly connected to a plate 102 which may be connected as an instance to the rear face of a vehicle with the arms 100 and 101 extending in opposite directions and connected to separate conductors 103 and 104 respectively so that as an instance assuming that the arms 100 and 101 are facing rearwardly of a vehicle, the lamp of the arm 100 is illuminated and the lamp of the arm 101 is extinguished when the vehicle turns to the left and on the other hand, the lamp in the arm 101 is illuminated while the lamp in the arm 100 is extinguished when the vehicle turns to the right.

With the embodiments illustrated in Figs. 7 to 10 inclusive, the inner faces of the arms 93, 94, 100 and 101 may all be covered with a light reflecting coating and similarly the outer faces of the louvers for the openings through the arms, such as the louvers 84 and 85 of the arm 94 may be covered with a light reflecting coating in order to obtain a maximum intensity of light with a given lamp.

It is obvious that various changes and modifications may be made to the details of construction without departing from the general spirit of the invention, as set forth in the appended claims.

I claim:

1. In an automobile direction indicator, the combination of two complemental sheet metal members forming a chambered housing converging into a closed outer extremity and having two opposing walls, there being two pairs of slots in each of said walls converging in the direction of the converging closed extremity formed by said members, louvers inclined to said walls and extending inwardly from the inner edges of one pair of slots, louvers inclined to said walls and extending inwardly from the outer edges of the pair of slots nearest the converging closed extremity formed by said members, and a small electric lamp bulb mounted between the converging ends of the first pair of slots and the diverging ends of the other pair of slots to enable the light rays from the lamp to be intercepted and deflected outwardly by said louvers but otherwise concealed from view substantially to prevent the passage of direct light rays from said lamp bulb to the exterior of said housing, said opposing walls being just sufficient to clear said lamp bulb.

2. In an automobile direction indicator, the combination of two complemental sheet metal members forming a chambered housing converging into a closed outer extremity having two opposing walls, there being two pairs of slots in each of said walls converging in the direction of the converging closed extremity formed by said members, louvers inclined to said walls and extending inwardly from the inner edges of one pair of slots, inclined to said walls and louvers extending inwardly from the outer edges of the pair of slots nearest the converging closed extremity formed by said members, an electric lamp bulb mounted between the converging ends of the first pair of slots and the diverging ends of the other pair of slots to enable the light rays from the lamp to be intercepted and deflected outwardly by said louvers but otherwise concealed from view substantially to prevent the transmission of direct light rays from said lamp bulb to the exterior of said housing, said opposing walls being spaced from one another just sufficient to clear said lamp bulb, and a light reflecting coating on the inner faces of said members and on the outer faces of said louvers to facilitate the transmission of the light rays from said lamp to the exterior of said arm.

RAPHAEL ATTI.